United States Patent Office 3,567,796
Patented Mar. 2, 1971

3,567,796
HYDROCARBON CONVERSION PROCESS WITH A HALOGENATED CATALYST UTILIZING HYDROCARBONS AND DERIVATIVES THEREOF IN ITS PREPARATION
John H. Estes and Robert M. Suggitt, Wappingers Falls, and Stanley Kravitz, Wiccopee, N.Y., assignors to Texaco Inc., New York, N.Y.
No Drawing. Continuation-in-part of application Ser. No. 646,458, June 16, 1967, which is a continuation-in-part of application Ser. No. 600,021, Dec. 8, 1966. This application Apr. 2, 1969, Ser. No. 812,914
Int. Cl. C07c 5/30; B01j 11/78
U.S. Cl. 260—683.68
9 Claims

ABSTRACT OF THE DISCLOSURE

A hydrocarbon conversion process in which a hydrocarbon is contacted at conversion conditions with a catalyst consisting essentially of (1) alumina, (2) a metal selected from the group consisting of ruthenium, rhodium, palladium and platinum, and (3) chlorine or bromine wherein at least a portion of said chlorine or bromine is introduced into said catalyst by contacting a composite of alumina and said metal at elevated temperature with a selected organic compound in the presence of chlorine or bromine. The catalyst so prepared is useful in hydrocarbon conversion processes as isomerization, hydrocracking, alkylation, hydrogenation and polymerization.

CROSS REFERENCE TO RELATED APPLICATIONS

This application is a continuation-in-part of our copending application Ser. No. 646,458, filed June 16, 1967, now abandoned which in turn is a continuation-in-part of our application Ser. No. 600,021, filed Dec. 8, 1966, now abandoned.

BACKGROUND OF THE INVENTION

Highly active catalysts prepared by the activation of metal alumina composites with certain organic chloride activating agents are described in British Pat. 953,187 and in application Ser. No. 419,755, filed Dec. 21, 1964. These catalysts are prepared by chloriding composites of platinum and alumina where the platinum is added to the composite before activation by any of various well known methods including for example, impregnation with a water soluble platinum compound such as chloroplatinic acid or precipitation of platinum as sulfide by passing hydrogen sulfide through an aqueous solution of a platinum compound. The platinum-alumina composite is thereafter activated by treatment with an organic chloride activating agent, for example, a chloroalkane corresponding to the general formula:

or an acid chloride under conditions effecting reaction of at least a portion of said activating agent with at least a portion of said activating agent with at least one component of the platinized alumina composite.

Broadly, this invention contemplates a hydrocarbon conversion process which comprises contacting a hydrocarbon at conversion conditions with a catalyst consisting essentially of (1) alumina, (2) about 0.01 to about 2 weight percent of a metal selected from the group consisting of ruthenium, rhodium, palladium and platinum, and (3) about 3.0 to 15.0 weight percent chlorine and/or bromine wherein said chlorine or bromine is introduced into said catalyst by contacting a composite of said metal and alumina at a temperature of about 200 to 800° F. with a combination of chlorine or bromine and an organic compound containing at least 2 carbon atoms.

It has now been found that organic compounds having at least 2 carbon atoms which have heretofore not been known to be activating agents will in the presence of chlorine or bromine render metal alumina composites active for the conversion of hydrocarbons when contacted therewith. Additionally, the effectiveness of acid chlorides as activating agents and particularly those acid chlorides having at least 2 carbon atoms, may be substantially increased by effecting contact of said activating agent and said alumina in an atmosphere containing chlorine or bromine.

Organic compounds contemplated as activating agents herein and employed in accordance with this invention include compounds of the general formula:

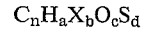

where X is chlorine or bromine and where $n$ is from 2 to 5, $a$ is from 0 to 12, $b$ is from 0 to 12, $c$ is from 0 to 2 and $d$ is from 0 to 2 and where the sum of $c$ and $d$ is not greater than 2. Preferred compounds for use of this invention include the organic compounds wherein X is chlorine and where the ratio of $a$ to $b$ is less than 1.0.

Included in the class of compounds contemplated as activators above, we mention ethane,
ethylene,
propane,
butane,
pentane,
trichloroethylene,
sym-tetrachloroethane,
tetrachloroethylene,
pentachloroethane,
hexachloroethane,
hexachloroacetone,
pentachloropropane,
hexachloropropanone-2,
hexachloropropylene,
octachloropropane,
hexachloro-1,3-butadiene,
octachlorobutanone,
octachlorobutylene,
heptachloropentane,
hexachlorocyclopentadiene,
decachloropentanone-3,
decachlorobutadithione,
octachlorodioxane,
trichloroacryloylchloride,
trichloroacetylchloride and
chloral.

Highly preferred activating agents are sym-tetrachloroethane and tetrachloroethylene. The exact mechanism by which the alumina composite is activated is not precisely understood especially since the process can be performed in the absence of oxygen or an oxygen containing atmosphere. This is particularly surprising since the process of copending application Ser. No. 810,031 filed Mar. 24, 1969 of John H. Estes and Robert M. Suggitt, entitled "Hydrocarbon Conversion Process With a Catalyst Activated With an Organic Chloride and Oxygen" necessitates use of an oxygen containing atmosphere in conjuction with multicarbon organic chloride activating agents employed in that process.

In accordance with our method of activation a composite containing alumina and about 0.01 to 2.0 weight percent of a metal selected from the group consisting of ruthenium, rhodium, palladium and platinum is simultaneously contacted with chlorine or bromine and the organic activating agent as hereinabove described to introduce within the range of about 3.0 to 15.0 percent by weight, chlorine or bromine onto the catalyst. The mole ratio of molecular chlorine or/and bromine to the organic compound must be greater than $a-b/2$ where $a$ is greater than $b$ or greater than 0 where $a$ is equal to or less than $b$. The mole ratio of chlorine or bromine should be greater if the organic compound contains sulfur. Specifically, if there are $d$ atoms of sulfur in the organic compound the mole ratio of chlorine or bromine to organic compound should be greater than $$\frac{a+2d-b}{2}$$

if $a+2d$ is greater than $b$ or greater than 0 if $a+2d$ is equal to or less than $b$. If the chlorine or bromine to organic compound mole ratio is greater than that specified above, however, no appreciable increase in catalytic activity is obtained. Since excess chlorine or bromine would be entailed in providing this higher mole ratio, from an economic standpoint, it is generally not desirable to exceed this amount substantially. The organic activating agent may be added in liquid form to the metal alumina composite and the mixture thereafter heated in the presence of chlorine or bromine. The catalyst may be produced in pellet, granular, bead or pulverulent form to facilitate its use in fixed beds, moving beds or fluidized solid beds as is well known in the art. Alternatively, the catalyst can be prepared in situ in a hydrocarbon conversion reactor by passing a stream of chlorine or bromine to a vessel containing the organic compound. The effluent is then charged into a hydrocarbon conversion reactor containing the alumina composite to be activated maintained at a temperature between 200 and 800° F. The effluent from the hydrocarbon conversion reactor consists largely of chlorine and/or bromine and saturated chlorocarbons. Excess saturated chlorocarbons can be recycled. We prefer to employ chlorine together with the multicarbon organic activators. However, in certain circumstances one may prefer to utilize bromine as it is in liquid form at room temperature.

The aluminas contemplated for activation with the combination of organic compound and chlorine or bromine are gamma or eta aluminas having a surface area of from about 100 to 450 m.$^2$/g. Aluminas possessing surface areas of about 150 m.$^2$/g. are preferably employed in such hydrocarbon conversion reactions as hydrogenation and those possessing surface areas of about 250 to 400 m.$^2$/g. are preferred in isomerization and hydrocracking. Further, the contemplated aluminas contain from about 0.5 to 3.0 and preferably about 1.5 to 3.0 and preferably about 1.5 to 2.4 percent by weight of water present as a mono-layer of hydroxyl groups on the alumina surface. One method of providing the aforementioned composites of alumina and a metal selected from the group consisting of ruthenium, rhodium, palladium and platinum with the designated surface area and percent water is by heating the metal alumina composite in a flowing inert gaseous stream at temperatures ranging from about 800 to 1250° F. for periods of 24 to ½ hours. Such conditions are sufficient to provide the composite with the prescribed water content without sintering the surface thereof.

With respect to temperature, we have found that a temperature of at least 450° F. is desirable for preparation of a highly active hydrocarbon conversion catalyst. temperatures less than 450 are generally insufficient to provide a highly active catalyst useful for commercial size operations. However, it should be understood that catalysts can be prepared down to a temperature of about 200° F. but these catalysts are not as active as those obtained using a temperature above 450° F. On the other hand, temperatures in excess of 700° F. tend to promote the formation of aluminum chloride or other side products with a loss of any platinum or other metal present and utilized in the catalyst base. Temperatures in excess of 800° F. should not be employed. We employ a temperature between 200 and 800° F. and preferably from about 450° F. to 650° F.

The catalysts prepared in accordance with this invention are highly active at relatively low temperatures. Chlorided metal alumina catalysts such as platinized alumina prepared as indicated above have a high activity for the isomerization of isomerizable hydrocarbons, for example, paraffiic hydrocarbons such as butanes, pentanes, hexanes and heptanes; and naphthenic hydrocarbons such as methylcyclopentane, cyclohexane and dimethylcyclopentane. Isomerization, for example, can be undertaken in either the liquid or vapor phase. Metal alumina catalysts prepared in accordance with this invention are also active in such additional hydrocarbon conversion reactions as hydrogenation, and hydrocracking. Hydrogenation of such feedstocks as olefins and aromatics such as benzene is undertaken at temperature of from 250 to 400° F. Hydrocracking of $C_7$ and higher hydrocarbons and hydroisomerization of $C_7$ and higher hydrocarbons is conveniently conducted at temperatures of from about 250 to 400° F. Pressures from atmospheric and higher are applicable. The activated composite metal alumina catalyst described above may be stabilized and its activity further enhanced by heating the activated catalyst to a temperature of from 800 to 1000° F. in a gaseous stream inert to the system such as hydrogen, nitrogen, helium, oxygen or argon for a period of 1 to 48 hours and thereafter contacting the catalyst with hydrogen chloride gas at temperatures of from 300 to 500° F.

In a highly preferred embodiment the chlorided platinized alumina catalyst prepared in accordance with this invention is highly active for the isomerization of hydrocarbon streams at relatively low temperatures. Streams containing $C_4$ to $C_6$ hydrocarbons such as butanes, pentanes, hexanes, cyclopentanes, and cyclohexanes are isomerized at temperature within the range of about 250 to 400° F. and preferably within the range of about 250 to 350° F. Isomerization may be effected in either the liquid or vapor phase. Pressures from atmospheric to the practical maximum as limited by materials of construction may be used and pressures within the range of 300 to 750 pounds per square inch gauge have been found convenient. A liquid hourly space velocity i.e., the volume of liquid charge per hour per volume of catalyst within the range of about 0.5 to 10.0, preferably within the range of about 0.75 to 4.0 is employed. Hydrogen is included in the isomerization feed and a mole ratio of hydrogen to hydrocarbon within the range of about 0.05:1 to 5:1 and preferably within the range of about 2:1 to 5:1 for pentanes and hexanes and about 0.1:1 to 1:1 for butanes.

PREPARATION OF CATALYST BASES

A composite of platinum and alumina can be prepared for use as an alumina composite to be activated by pilling beta-alumina trihydrate, calcining at 930° F. for two hours, cooling to room temperature, impregnating with aqueous solution of chloroplatinic acid and ethylene diamine, drying and calcining at 1050° F. for two hours. The platinized alumina composite resulting from this treatment comprises predominantly eta-alumina, with a small amount fo platinum. The amount of platinum impregnated is adjusted in preparation of the catalyst, about 0.6 weight percent platinum is normally deposited.

A palladium tetraamine complex is formed by dissolving 8.5 grams of palladium chloride in 55 cc. of concentrated hydrochloric acid, diluting with 900 cc. of distilled water and 115 cc. of concentrated ammonium hydroxide and heating at 140° F. with stirring for about 30 minutes until the precipitate originally formed is dissolved. The resulting solution is cooled and added to 1711 grams of one-eighth inch eta alumina pills in a cooling bath. After thorough mixing, the pills are dried overnight at 300° F. and then calcined at 1050° F. for two hours forming a composite containing 0.3 weight percent palladium. Similarly, a rhodium composite containing 0.4 percent rhodium is prepared by this procedure.

In order to more fully illustrate the nature of our invention in the manner of practicing the same, the following examples are presented. In these examples the best mode contemplated by us for carrying out our invention is set forth.

Example I

Two thousand cubic centimeters of the platinum-alumina composite prepared by the above procedure are distributed in a bed 6 feet in height. The bed is maintained at a temperature of 540° F. and at a pressure of 50 p.s.i.g. Two hundred seventy pounds air per hour per square foot of reactor cross section pass down through the bed together with chlorine and tetrachloroethylene in a mole ratio of 1:2. The initial charge of tetrachloroethylene to the platinum alumina composite is at a rate of 0.115 gallon per hour per square foot of reactor cross section. This continues for about four hours and the rate of tetrachloroethylene is subsequently increased so that a total dosage of 20 volumes of tetrachloroethylene per 100 volumes platinum-alumina composite are charged within a 24 hour period. The catalyst so formed contains 8 weight percent chlorine.

The so activated composite is useful in the isomerization of isomerizable hydrocarbons particularly n-butane. It possesses high activity with respect to n-butane isomerization and has a good catalytic life. At 335° F., 500 p.s.i.g. and 2 LHSV with 0.2:1 hydrogen to hydrocarbon mole ratio, n-butane feed is converted to 61.5 percent isobutane for over 100 hours.

Example II 166 grams of platinum-alumina composite prepared by the above procedure are loaded into a tube. An air-chlorine gas mixture (5% by volume chlorine) was passed at 200 ml. per minute through liquid chloral which evaporated into the gas stream at 2.3 ml. per hour. The platinum-alumina composite was held at a temperature of 540° F. for seven hours during activation. The amount of chlorine placed on the catalyst was 8.0 percent by weight. The catalyst so prepared was evaluated for n-hexane isomerization at 300° F., 300 p.s.i.g., 3.2:1 hydrogen to hydrocarbon mole ratio and 1 LHSV. The total conversion of n-hexane to an isomeric form was 82.6 percent and 17.2 percent conversion of the n-hexane to 2,2-dimethylbutane.

Example III

Into a bed containing 166 grams of a platinum-alumina composite containing 0.6% by weight platinum, prepared according to the method of Example 1, was introduced a gas mixture consisting of air at 4 cubic feet per hour containing approximately 1 percent by volume each of tetrachloroethylene vapor and chlorine. The bed was maintained at a temperature of 550° F. and under a pressure of 50 p.s.i.g. The time of contacting the platinum-alumina composite with the vapor mixture of air, tetrachloroethylene and chlorine was 24 hours and the actual physical volume of liquid tetrachloroethylene charged was 24 cc. (40 g.). The finished catalyst contained 8.4 weight percent chlorine. It was evaluated for n-hexane isomerization. It gave a total conversion of n-hexane to isomeric form of 89.4 weight percent of which 29.7 weight percent was 2,2-dimethylbutane. The isomerization of n-hexane was performed at 300° F.; 300 p.s.i.g., 3.2:1 hydrogen to hydrocarbon mole ratio; and 1.0 liquid hourly space velocity.

Example IV 166 grams of a platinmum-alumina composite prepared by the above method was preheated to 1050° F. for two hours and treated at 550° F. and under 50 p.s.i.g. with tetrachloroethylene and chlorine in a mole ratio of 1:1.5. The tetrachloroethylene was charged at a rate of 1.3 cc. per hour and chlorine at a rate of 7.7 cc. per minute (at room temperatures of about 70° F.), into prepurified nitrogen at 4 cubic feet per hour until 26.3 cc. of tetrachloroethylene had been added. The gas flow was continued for an additional hour after which the catalyst was discharged under a protective nitrogen atmosphere into a closed container. The so prepared catalyst containing 8.6% chlorine and about 0.55% platinum was evaluated for hexane isomerization at 300° F., 300 p.s.i.g. with a hydrogen to hydrocarbon mole ratio of 3.2:1 and a liquid hourly space velocity of 1.0. The catalyst gave a total conversion of n-hexane to hexane isomers of 89.7 weight percent of which 29.0 weight percent was 2,2-dimethylbutane. A further treatment of a portion of this catalyst consisting of about 100 grams by heating to 800° F., treating with a flow of hydrogen passing therethrough at a rate of 5 cubic feet per hour and treating the catalyst with a mixture of anhydrous hydrogen chloride and nitrogen in mole ratio of about 1:1 for one hour at a flow rate of HCl/N$_2$ mixture through the catalyst of 1.1 cubic feet per hour at 500° F. gave a catalyst having a conversion of n-hexane to 2,2-dimethylbutane of 29.7 weight percent.

Example V 166 grams of a platinum-alumina composite prepared by the above method was preheated to 1,050° F. and dried to 2 weight percent water. The catalyst base was treated at 550° F. under an air pressure of 400 p.s.i.g. at a flow rate of 15 cubic feet per hour with solution of 58.4 grams of bromine and 307 grams tetrachloroethylene at a rate of 16 cubic centimeters per hour for 12 hours. The resultant catalyst had 7.5 percent by weight chlorine.

The catalyst was evaluated for n-hexane isomerization at 300° F. under a pressure of 300 p.s.i.g. and a hydrogen to hydrocarbon mole ratio of 3.2. The liquid hourly space velocity employed was 1.0. The catalyst gave a conversion of n-hexane to 2,2-dimethylbutane of 18.8 weight percent with a total conversion of 86.8 weight percent.

Example VI

Using the same catalyst base used in Example V catalysts were prepared using other multicarbon activating agents in conjunction with chlorine. The pressure in the reactor was 50 p.s.i.g. They were evaluated for n-hexane isomerization at 300° F., 300 p.s.i.g., 3.2 hydrogen to hydrocarbon mole ratio and 1.0 liquid hourly space velocity. The data on the preparation of the catalyst is set forth in Table I, below, together with the results of the n-hexane isomerization. Table II, below, shows the results of dynamic activation with a multi-carbon activator without using chlorine. It is seen that the chlorine content employing a procedure wherein chlorine gas or bromine is not used in conjunction with the chlorinated or brominated hydrocarbon provides a catalyst which has a distinctly lower chlorine content. This chlorine content, it is believed, provides significant benefits in isomerization. For instance, it can be seen that the isomerization provided using a catalyst which was prepared by activating the base with a multicarbon activator and chlorine provides substantially better isomerization whereas a catalyst activated solely with a multi-carbon activator i.e. without use of chlorine in the system during the activation step, is substantially inferior. It is believed that the results shown below in Tables I and II point out the presence of chlorine or bromine in the system provides significant benefits not obtained in a system not employing chlorine in activation of the catalyst base.

TABLE I.—DYNAMIC ACTIVATIONS WITH MULTICARBON ACTIVATOR PLUS CHLORINE

| Activator | Activator chlorine ratio | Temperature, °F. | Activator charge rate, grams/hour | Total charge | Carrier gas, rate | Weight percent chlorine | Evaluation 2,2-dimethylbutane | Data—Records total conversion |
|---|---|---|---|---|---|---|---|---|
| Hexachloropropene | 1/1 | 600 | 2 | 53 | Air, 4 cu. ft./hr | 9.4 | 26.0 | 85.5 |
| Hexachloroacetone | 1/1 | 500 | 2 | 52 | Air, 4 cu. ft./hr | 8.8 | 25.0 | 88.6 |
| Pentachloroethane | 1/1 | 550 | 2 | 53 | Air, 4 cu. ft./hr | 8.0 | 22.8 | 86.8 |

TABLE II.—DYNAMIC ACTIVATION WITH MULTICARBON ACTIVATORS WITHOUT CHLORINE

| Activator | Pressure, p.s.i.g. | Temperature, °F. | Activator charge rate, grams/hour | Total charge | Carrier gas, rate | Weight percent chlorine | Evaluation 2,2-dimethylbutane | Data—Records total conversion |
|---|---|---|---|---|---|---|---|---|
| Hexachloropropene | 300 | 600 | 82 | 408 | Air, 15 cu. ft./hr | 7.5 | 17.1 | 86.9 |
| Hexachloroacetone | 300 | 550 | 82 | 408 | Air, 15 cu. ft./hr | 5.7 | 0 | 14.7 |
| Pentachloroethane | 200 | 550 | 82 | 407 | N₂/O₂ 1/1, 15 cu. ft./hr | 4.7 | 0 | 0 |

Example VII 166 grams of a platinum-alumina composite prepared by the above method were preheated to 1,050° F. for 2 hours and 575° F. under a pressure of 50 p.s.i.g. while 2 cubic centimeters of 1,2-dichloroethane per hour and 15 cubic centimeters of chlorine gas per minute were passed therethrough employing air as a carrier. The ratio of 1,2-dichloroethane to chlorine was 1:3. The composite was treated with a mixture of 1,2-dichloroethane and chlorine over a 24 hour period. A portion of the resultant activated catalyst was heat treated by passing hydrogen at a rate of 5 cubic feet per hour through the same while maintained at 800° F. for 4 hours. The heated catalyst was cooled to 500° F. at which temperature one half cubic foot of HCl together with one half cubic foot nitrogen was passed therethrough over a period of 1 hour. The resultant catalyst had greater than 10 weight percent chlorine. The unheat-treated catalyst was evaluated for n-hexane isomerization employing the parameters set forth above in Example IV. It provided a conversion of the n-hexane to 3-methylpentane of 20.4 weight percent, to a mixture of 2,2-methylpentane and 2,3-dimethylbutane of 39.7% and to 2,2-dimethylbutane of 26.6%. The heat treated catalyst provided a conversion of n-hexane to 3-methylpentane of 18.6%, to a mixture of 2-methylpentane and 2,3-dimethylbutane of 39.4% and to 2,2-dimethylbutane of 27.4 weight percent.

Example VIII 166 grams of a platinum-alumina composite prepared by the above method was heated to 1,050° F. and dried to 2 weight percent water. The catalyst base was treated to 575° F. under nitrogen pressure of 50 p.s.i.g. 2.8 cc. per minute ethane together with 16.8 cc. per minute chlorine gas were passed through the composite bed over a period of about 24 hours. A portion of the resultant activated catalyst was stabilized by heating it at a temperature of 800° F. for 4 hours while hydrogen was passed therethrough at a rate of 5 cubic feet per hour and thence treating with a mixture of HCl and nitrogen at 500° F. for one hour, each gas passing through the composite at a rate of one half cubic feet per hour. The weight percent chlorine of the unstabilized composite was 8.3 and the stabilized composite contained 7.2 weight percent chlorine. The unstabilized activated composite was evaluated for n-hexane isomerization employing the isomerization conditions of Example IV. It provided conversion of 3-methylpentane of 9.9%, to a mixture of 2-methylpentane and 2,3-dimethylbutane of 24.6% and 2,2-dimethylbutane of 1.1%. The stabilized composite provided conversion of the n-hexane to 3-methylpentane of 8.6% to a mixture of 2-methylpentane and 2,3-dimethylbutane of 19.3% and to 2,2-dimethylbutane of 0.6%. The isomerization parameters employed for this n-hexane isomerization are those set forth above in Example IV.

Example IX 200 grams of palladium, rhodium, or platinum as indicated in the table below were charged to a nickel reactor. Air or nitrogen, as indicated, was employed as a sweep gas at a rate of 4 cubic feet per hour under a pressure of 50 p.s.i.g. The chlorocarbon designated below was added to the gas stream at a ratio of 1.3 cubic centimeters per hour and chlorine was used at 4.4 cubic centimeters per minute (S.T.P.) for 24 hours with the reactor system at 550° F.

TABLE III

| Activator | Base | Wt. percent Cl₂ | Evaluating data, 300 p.s.i.g. 300° F. 3.2 hydrogen: hydrocarbon mole ratio, 1 LHSV | | | |
| | | | n-Hexane | 3-methyl-pentane | 2-methylpentane, 2,3-dimethylbutane | 2,2-dimethylbutane |
|---|---|---|---|---|---|---|
| Tetrachlorethylene, Cl₂* | Palladium eta Al₂O₃ | 9.0 | 10.0 | 17.2 | 40.3 | 32.5 |
| Hexachloropropanone-2, Cl₂* | do | 10.0 | 10.9 | 18.4 | 39.5 | 31.2 |
| Tetrachloroethylene, Cl₂* | Rhodium eta Al₂O₃ | 7.0 | 11.4 | 19.0 | 40.2 | 29.4 |
| Tetrachloroethylene, Cl₂* | Platinum eta Al₂O₃ | 9.1 | 10.4 | 17.7 | 39.5 | 32.4 |

The catalyst preparations indicated by an asterisk had the resultant organic chloride-chlorine activated composite treated by heating to 800° F. in a hydrogen stream for a period of 4 hours following which the composite was treated with hydrogen chloride together with hydrogen at 500° F. for one hour. This procedure "stabilized" the catalyst to render it active for a long period of time.

The use of chlorine and/or bromine together with an organic compound such as a chlorocarbon where the chlorocarbon has an unsaturated linkage or other reactive group such as

is most effective. The most preferred procedure, according to our invention, uses a 1:1 mole ratio of chlorine or bromine to chlorocarbon with a limited amount of employment of temperatures above say 450° F. The use of the unsaturated linkage or other reactive group together with the chlorine or bromine below this temperature insures that the chlorocarbon molecule does not become saturated and rendered less active or reactive resulting in a reduction in the efficiency of the activation. At the higher chlorine or bromine ratios a side reaction is encouraged. In dealing with lower ratios at 3:1 of chlorocarbon to chlorine or bromine, the activity of the catalyst can tend to drop slightly. However, this decrease is only slight and other runs have shown that a chlorocarbon to chlorine ratio of 4:1 shows no decrease in activity.

Several runs employing tetrachloroethylene to chlorine at various tetrachloroethylene/chlorine ratios were performed. In each case the activation was of 166 grams of base catalysts containing either platinum or palladium as the metal as indicated below and the activation was performed at 550° F. An activator charge of 1⅓ cubic centimeters per hour for 24 hours in air or nitrogen sweep stream at 4 cubic feet per hour under 50 p.s.i.g. tetrachloroethylene was used. Where any by-product or side product was formed, that product was believed to be hexachloroethane. The Table IV below indicates the results obtained employing various tetrachloroethylene to chlorine mole ratios. From that it will be observed that at the ratio of 1:1, the isomerization of an n-hexane stream is relatively good especially in terms of producing 2,2-dimethylbutane and the amount of by-product recovery with relation thereto is small. It should also be observed that employing a palladium-alumina base catalyst that the isomerization was slightly better, a feature believed to be of significant importance to this invention.

TABLE V

|  | Charge n-Hexane | Hexane product | 10% dodecane charge | Dodecane product |
|---|---|---|---|---|
| $C_3$ |  | Trace |  | 0.4 |
| $C_4$ isomers |  | 0.1 |  | 3.6 |
| n-$C_4$ |  | Trace |  | 0.3 |
| $C_5$ isomers |  | 0.1 |  | 2.1 |
| n-$C_5$ |  | Trace |  | 0.4 |
| 2,2-dimethylbutane |  | 16.2 |  | 23.6 |
| 2,3-dimethylbutane and 2-methylpentane | Trace | 41.3 | 0.1 | 37.0 |
| 3-methylpentane | 2.4 | 21.5 | 2.3 | 16.0 |
| n-$C_6$ | 89.0 | 16.1 | 73.5 | 10.0 |
| Methylcyclopentane | 8.6 | 3.2 | 8.2 | 3.4 |
| Cyclohexane |  | 2.5 |  | 2.6 |
| $C_7$+ |  |  |  | 0.6 |
| $C_{12}$ |  |  | 15.8 |  |

From the above tabulation it will be seen that the catalyst not only possesses substantial isomerization activity but additionally hydrocracking activity.

EXAMPLE XI

The catalyst of the preceding example was evaluated for hydrogenation activity by employing a charge stock comprising 10% cyclohexene in n-hexane. The charge stock

TABLE IV

| Tetrachloroethane/chlorine ratio | Base | Evaluation data, 300 p.s.i.g., 300° F., 3.2 hydrogen: hydrocarbon mole ratio, 1 LHSV | | | | |
|---|---|---|---|---|---|---|
|  |  | n-Hexane | 3-methylpentane | 2-methylpentane 2,3-dimethylbutane | 2,2-dimethylbutane | By product recovery, grams |
| 1:1 | Platinum eta $Al_2O_3$ | 10.4 | 17.7 | 39.5 | 32.4 | 33 |
| 3:1 | do | 11.7 | 19.4 | 42.1 | 26.8 | N.a. |
| 2:1 | do | 9.4 | 17.5 | 41.8 | 31.3 | 34 |
| 4:1 | do | 10.0 | 18.5 | 41.4 | 30.1 | 23 |
| 1:1 | do | 10.0 | 17.2 | 40.3 | 32.5 | 39 |
| 2:1 | do | 10.1 | 18.5 | 40.5 | 30.9 | 35 |

N.a.=Not available.

EXAMPLE X

A composite of platinum and alumina comprising 0.6 weight percent platinum on 1/16 inch eta alumina extrudate having a surface area of 330 m.²/g. was heated to a temperature of 1,050° F. for 4 hours such that the composite possessed a water content of 2 weight percent present as a mono-layer of hydroxyl groups on the composite surface. 166 grams of this composite was activated by treating with tetrachloroethylene and chlorine in a mole ratio of chlorine to organic compound of 1.0 and a temperature of 575° F. and at a pressure of 50 p.s.i.g. Tetrachloroethylene was introduced at the rate of 1.3 cc. per hour along with the mole equivalent of chlorine into an air stream at 40 cubic feet per hour. The period of activation was 24 hours at which time an activated platinized alumina catalyst was recovered containing a chlorine content of 9.0 weight percent. The activated catalyst was thereafter stabilized for maximum life and activity by heating to 800° F. in a stream of hydrogen flowing at the rate of 5 cubic feet per hour for 4 hours and thereafter treating with HCl at the rate of ½ cubic foot per hour at 500° F. for 2 hours at atmospheric pressure. The chlorine content of the so activated and stabilized catalyst was 9.1 weight percent.

The stabilized catalyst prepared above was contacted with normal hexane and hydrogen at hydroisomerization conditions including a reaction temperature of 300° F., a pressure of 300 p.s.i.g., a liquid hourly space velocity of 1 and a hydrogen:hydrocarbon mole ratio of 3.2/1. The charge stock contained 10 volume percent of 99.9 weight percent n-dodecane in n-hexane. Table V compares the composition of the charge stock with the respective product streams.

was passed over the catalyst at 300° F., 300 p.s.i.g. and a hydrogen:hydrocarbon mole of 3.2:1 and a liquid hourly space velocity of 1.0. Table VI compares the composition of the charge with the product stream.

TABLE IV

|  | Cyclohexene-n-Hexane charge | Product |
|---|---|---|
| $C_4$ isomers |  | 1.0 |
| n-$C_4$ |  | Trace |
| $C_5$ isomers |  | 0.5 |
| n-$C_5$ |  | Trace |
| 2,2-dimethylbutane |  | 20.4 |
| 2,3-dimethylbutane |  | 8.3 |
| 2-methylpentane |  | 27.2 |
| 3-methylpentane |  | 15.6 |
| n-Hexane | 90.0 | 10.3 |
| Methylcyclopentane |  | 8.5 |
| Cyclohexane |  | 6.9 |
| Cyclohexene | 10.0 |  |
| Heavier |  | 1.3 |

The cyclohexene added to the n-hexane is both hydrogenated and isomerized to give an equilibrium mixture of methylcyclopentane and cyclohexane.

From the foregoing it is seen that we have provided a significantly useful process for the preparation of a catalyst useful in the hydrocarbon conversion. Our catalyst is particularly useful in the isomerization of isomerizable hydrocarbons especially paraffinic hydrocarbons in the $C_4$–$C_6$ range. Our catalyst can also be used in alkylation processes without varying the manipulative procedures to accommodate the catalyst prepared by our invention. It provides high catalytic activity and good conversion of the isomerizable hydrocarbons to its isomer. It is seen that our process can be performed in situ i.e. within the hydrocarbon conversion reactor itself and does not necessitate withdrawal of catalyst from the vessel for transfer to the hydrocarbon conversion reactor with the attendant problem of subjecting the catalyst to moisture. It should be further noted that our process can be performed to regenerate a spent catalyst by first heating the spent catalyst to decarbonize the catalyst and then treating in the manner of our invention. Our process can be performed without use of expensive chemicals, high pressures or temperatures and is thus suited for commercial operation. In addition it should be noted that our catalyst can contain any one of the aforementioned metals, platinum, palladium, ruthenium and rhodium depending upon the choice of the particular operator, the availability of the metal etc. The activation of catalyst bases containing any of these metals proceeds essentially in the same way of the activation of alumina base catalysts containing another metal of the group. Thus the manipulative procedure does not vary from one metal to the other.

The terms and expressions which have been used herein are terms of description and not of limitation, as there is no intention, in the use of such terms and expressions, of excluding any equivalents of the features shown and described or portions thereof, as it is recognized that various modifications are possible within the scope of the invention. In addition to the specific naphthenic and paraffinic hydrocarbons, other hydrocarbons can be isomerized and our process can be used in other hydrocarbon conversion processes. Furthermore, the process of our invention can be performed on an alumina catalyst containing silica. In such a case, particularly when the composite contains platinum, a highly active catalyst is prepared.

We claim:
1. A hydrocarbon conversion process which comprises contacting a hydrocarbon at a temperature range of from about 100° to 400° F. with a catalyst consisting essentially of (1) alumina, (2) about 0.01 to about 2 weight percent of a metal selected from the group consisting of ruthenium, rhodium, palladium and platinum, and (3) about 3.0 to 15.0 weight percent chlorine and/or bromine wherein said chlorine or bromine is introduced into said catalyst by contacting a composite of said metal and alumina at a temperature of about 200 to 800° F. with a combination of (a) chlorine or bromine and (b) an organic compound selected from the group consisting of hydrocarbons and derivatives thereof containing one or more atoms of chlorine, bromine, oxygen or sulfur, said organic compound containing 2 to 5 carbon atoms.

2. A process according to claim 1 wherein said organic compound is selected from the group consisting of chloral, tetrachloroethylene, sym-tetrachloroethane, pentachloroethane, hexachloropropanone-2, hexachloropropylene and hexachloro-1,3-butadiene.

3. A process according to claim 1 wherein said hydrocarbon conversion process is isomerization, said hydrocarbon contains from 4 to 6 carbon atoms and said reaction temperature is within the range of about 250 to 350° F., a liquid hourly space velocity within the range of about 0.5 to 10.0 volumes of liquid hydrocarbon feed per volume of catalyst and a hydrogen:hydrocarbon feed mole ratio within the range of about 0.05:1 to 5:1.

4. A method of preparing a catalyst consisting essentially of (1) alumina, (2) about 0.01 to about 2 weight percent of a metal selected from the group consisting of ruthenium, rhodium, palladium and platinum, and (3) about 3.0 to 15.0 weight percent chlorine and/or bromine which comprises contacting a composite of said metal and alumina at a temperature of about 200 to 800° F. with a combination of (a) chlorine or bromine and (b) an organic compound selected from the group consisting of hydrocarbons and derivatives thereof containing one or more atoms of chlorine, bromine, oxygen or sulfur, said organic compound containing 2 to 5 carbon atoms.

5. A method according to claim 4 wherein said organic compound is selected from the group consisting of chloral, tetrachloroethylene, sym-tetrachloroethane, pentachloroethane, hexachloropropanone-2, hexachloropropylene and hexachloro-1,3-butadiene.

6. A method according to claim 4 wherein said metal alumina composite is contacted with said chlorine or bromine and organic compound at a temperature of about 450 to 650° F.

7. A method according to claim 4 wherein said catalyst contains from about 0.01 to 2.0 weight percent platinum and where said organic compound is tetrachloroethylene.

8. A hydrocarbon conversion process which comprises contacting a hydrocarbon at conversion temperatures ranging from about 100° to 400° F. with a catalyst consisting essentially of:
(1) alumina,
(2) about 0.01 to about 2 weight percent of a metal selected from the group consisting of ruthenium, rhodium, palladium and platinum,
(3) from about 3.0 to 15.0 weight percent of the group consisting of chlorine and/or bromine, wherein said chlorine and/or bromine is introduced into said catalyst by contacting a composite of said metal and alumina at a temperature of about 200 to 800° F. with a combination of (a) halogen selected from the group consisting of chlorine and bromine and (b) aliphatic hydrocarbon containing 2 to 5 carbon atoms.

9. The hydrocarbon conversion process of claim 8 wherein said aliphatic hydrocarbon is ethane.

References Cited

UNITED STATES PATENTS

| | | | |
|---|---|---|---|
| 2,944,097 | 7/1960 | Starnes et al. | 260—683.68 |
| 3,242,228 | 3/1966 | Riordan et al. | 260—683.68 |
| 3,242,229 | 3/1966 | Estes | 260—683.68 |
| 3,366,705 | 1/1968 | Giannetti et al. | 260—683.68 |
| 3,440,300 | 4/1969 | Estes et al. | 260—683.68 |
| 3,449,264 | 6/1969 | Myers | 260—683.68 |

DELBERT E. GANTZ, Primary Examiner

G. J. CRASANAKIS, Assistant Examiner

U.S. Cl. X.R.

208—124, 143; 252—441